(12) United States Patent
Wagner

(10) Patent No.: US 7,449,156 B2
(45) Date of Patent: Nov. 11, 2008

(54) MOLTEN METAL REACTOR UTILIZING MOLTEN METAL FLOW FOR FEED MATERIAL AND REACTION PRODUCT ENTRAPMENT

(75) Inventor: Anthony S. Wagner, Lakeway, TX (US)

(73) Assignee: Clean Technologies International Corporation, Lakeway, TX (US)

( * ) Notice: Subject to any disclaimer, the term of this patent is extended or adjusted under 35 U.S.C. 154(b) by 680 days.

(21) Appl. No.: 10/817,461

(22) Filed: Apr. 2, 2004

(65) Prior Publication Data
US 2004/0191138 A1    Sep. 30, 2004

Related U.S. Application Data

(62) Division of application No. 10/014,976, filed on Dec. 11, 2001, now Pat. No. 6,717,026.

(60) Provisional application No. 60/271,825, filed on Feb. 27, 2001.

(51) Int. Cl.
G21C 1/00 (2006.01)
B01J 8/00 (2006.01)
A62D 3/00 (2007.01)
F23G 7/00 (2006.01)
F23G 5/00 (2006.01)
F23G 1/00 (2006.01)
G21F 9/00 (2006.01)

(52) U.S. Cl. .................. 422/159; 422/232; 422/233; 588/314; 588/316; 588/1; 110/237; 110/247; 110/346

(58) Field of Classification Search .................. 422/159, 422/232, 233; 110/346, 247, 250, 237; 588/1, 588/314, 316
See application file for complete search history.

(56) References Cited

U.S. PATENT DOCUMENTS 3,812,620 A * 5/1974 Titus et al. ..................... 48/65

(Continued)

FOREIGN PATENT DOCUMENTS

WO    WO 93/25278 A1    12/1993

OTHER PUBLICATIONS

Supplementary European Search Report under Article 157(2) EPC for European Application No. 02786985.8-2111 (3 Pages).

(Continued)

*Primary Examiner*—Walter D. Griffin
*Assistant Examiner*—Huy-Tram Nguyen
(74) *Attorney, Agent, or Firm*—Russell D. Culbertson; The Culbertson Group, P.C.

(57) ABSTRACT

A molten metal reactor (10) quickly entrains a feed material in the molten reactant metal (16) and provides the necessary contact between the molten reactant metal and the feed material to effect the desired chemical reduction of the feed material. The reactor (10) includes a unique feed structure (24) adapted to quickly entrain the feed material into the molten reactant metal (16) and then transfer the molten reactant metal, feed material, and initial reaction products into a treatment chamber (12). A majority of the desired reactions occur in the treatment chamber (12). Reaction products and unspent reactant metal are directed from the treatment chamber (12) to an output chamber (14) where reaction products are removed from the reactor. Unspent reactant metal (16) is then transferred to a heating chamber (15) where it is reheated for recycling through the system.

17 Claims, 4 Drawing Sheets

U.S. PATENT DOCUMENTS

| | | | |
|---|---|---|---|
| 4,179,102 A * | 12/1979 | Clumpner | 266/218 |
| 4,286,985 A | 9/1981 | Van Linden et al. | |
| 4,552,667 A | 11/1985 | Shultz | |
| 4,574,714 A * | 3/1986 | Bach et al. | 588/314 |
| 4,598,899 A | 7/1986 | Cooper | |
| 4,666,696 A | 5/1987 | Shultz | |
| 4,681,599 A | 7/1987 | Obkircher | |
| 4,770,109 A | 9/1988 | Schlienger | |
| 4,787,320 A | 11/1988 | Raaness et al. | |
| 4,930,986 A | 6/1990 | Cooper | |
| 5,000,101 A | 3/1991 | Wagner | |
| 5,143,000 A | 9/1992 | Camacho | |
| 5,143,357 A | 9/1992 | Gilbert et al. | |
| 5,167,919 A | 12/1992 | Wagner | |
| 5,271,341 A | 12/1993 | Wagner | |
| 5,301,620 A | 4/1994 | Nagel et al. | |
| 5,353,318 A * | 10/1994 | Gluntz | 376/283 |
| 5,436,210 A * | 7/1995 | Wilkinson et al. | 588/314 |
| 5,443,572 A * | 8/1995 | Wilkinson et al. | 266/46 |
| 5,452,671 A | 9/1995 | Wagner | |
| 5,461,991 A | 10/1995 | Wagner | |
| 5,491,279 A * | 2/1996 | Robert et al. | 588/314 |
| 5,545,390 A | 8/1996 | Drakesmith et al. | |
| 5,555,822 A * | 9/1996 | Loewen et al. | 110/237 |
| 5,564,351 A * | 10/1996 | Wagner | 110/346 |
| 5,571,486 A | 11/1996 | Robert et al. | |
| 5,613,245 A | 3/1997 | Robert | |
| 5,640,702 A * | 6/1997 | Shultz | 588/1 |
| 5,711,017 A | 1/1998 | Bitler et al. | |
| 5,745,861 A | 4/1998 | Bell et al. | |
| 5,809,911 A | 9/1998 | Feizollahi | |
| 5,925,165 A | 7/1999 | Pflugl et al. | |
| 6,036,745 A | 3/2000 | Gilbert et al. | |
| 6,037,517 A * | 3/2000 | Wagner | 588/1 |
| 6,069,290 A | 5/2000 | Wagner | |
| 6,074,455 A | 6/2000 | van Linden et al. | |
| 6,195,382 B1 * | 2/2001 | Wagner | 373/146 |
| 6,227,126 B1 | 5/2001 | Wagner | |
| 6,600,768 B2 | 7/2003 | Fishman et al. | |

OTHER PUBLICATIONS

Communication pursuant to Article 96(2) EPC dated Jul. 3, 2007 (European Application No. 02 786 985.8-2104)(3 Pages).

* cited by examiner

MOLTEN METAL REACTOR UTILIZING MOLTEN METAL FLOW FOR FEED MATERIAL AND REACTION PRODUCT ENTRAPMENT

CROSS-REFERENCE TO RELATED APPLICATIONS

This application is a divisional of U.S. patent application Ser. No. 10/014,976 filed Dec. 11, 2001, entitled "Molten Metal Reactor Utilizing Molten Metal Flow for Feed Material and Reaction Product Entrapment," now U.S. Pat. No. 6,717, 026 B2, which claimed priority from U.S. provisional patent application Ser. No. 60/271,825 filed Feb. 27, 2001, entitled "Molten Metal Reactor Utilizing Molten Metal Flow for Feed Material and Reaction Product Entrapment." The Applicant claims priority from U.S. patent application Ser. No. 10/014, 979 under 35 U.S.C. §120, and claims priority from provisional application No. 60/271,825 under 35 U.S.C. §119(e). The entire content of each of these applications is incorporated herein by this reference.

TECHNICAL FIELD OF THE INVENTION

This invention relates to molten metal reactors for treating waste materials and soils contaminated with waste materials. More particularly, the invention relates to a molten metal reactor having an improved arrangement for entraining or entrapping feed materials with a molten reactant metal to effect the desired chemical reduction of the feed material. The invention encompasses a molten metal reactor apparatus, a structure for introducing a feed material into such a reactor, a method for treating waste material with a molten metal, and a method for introducing a feed material into a molten metal reactor.

BACKGROUND OF THE INVENTION

Molten metal reactors utilize a molten reactant metal to chemically react with a feed material in order to reduce the feed material to relatively innocuous compounds and chemical elements. For example, U.S. Pat. No. 5,000,101 to Wagner discloses a molten metal reactor for treating chlorinated hydrocarbons and other dangerous organic chemicals to produce carbon, metal salts, and gases such as nitrogen and hydrogen. U.S. Pat. No. 5,271,341 to Wagner discloses a molten metal reactor for treating boxed biomedical wastes which may include hazardous biological wastes mixed with other materials and metals. The disclosed molten reactant metal chemically reduces biological materials and other organic materials in this waste to carbon, metal salts and elemental gasses. Metals such as stainless steel "sharps" in the waste dissolve or melt into the reactant metal.

A consistent issue with molten metal reactors is providing the necessary contact between the material to be treated or reacted, that is, the "feed material," and the molten reactant metal. U.S. Pat. No. 5,271,341 to Wagner discloses submerging the boxed biomedical wastes in the reactant metal bath with a submerging or plunger structure to provide the desired contact between the waste material and the molten reactant metal. Although the submerging structure works well with certain types of waste materials, such structures are not well suited for submerging other types of materials. In particular, plunger structures are not well suited for use in relatively high-volume waste treatment applications in which relatively large quantities of loose or bulk feed materials, such as contaminated soils, for example, must be processed.

SUMMARY OF THE INVENTION

A molten metal reactor according to the present invention quickly entrains a feed material in the molten reactant metal and provides the necessary contact between the molten reactant metal and the feed material to effect the desired chemical reduction of the feed material. The quick entrainment of feed material in the molten reactant metal is accomplished with a unique feed structure in which the feed material is added to the reactant metal and then quickly transferred into a treatment chamber together with the molten reactant metal and any initial reaction products. A majority of the desired reactions occur in the treatment chamber. Reaction products and unspent reactant metal are preferably directed from the treatment chamber to an output chamber where reaction products are removed from the reactor. Unspent reactant metal is then preferably transferred to a heating chamber where it is reheated for recycling through the system.

According to the invention, the feed structure associated with the reactor introduces feed material into the molten reactant metal so that a flow of molten reactant metal immediately carries substantially all of the feed material and any initial reaction products into the treatment chamber. The feed material and reaction products are then trapped in the treatment chamber preferably by means of a suitable gravity trap structure. This combination of substantially immediate introduction into the treatment chamber and trapping in the treatment chamber helps ensure that the feed material and any intermediate reaction products have sufficient contact with the molten reactant metal to provide the desired chemical reactions, that is, the substantially complete chemical reduction of the feed material.

The desired contact with the reactant metal is enhanced according to the invention by inducing a swirling or vortex flow in the molten reactant metal in a feed chamber in which the feed material first makes contact with the molten reactant metal. This swirling flow may be produced in any suitable fashion, including by directing the molten metal into the feed chamber in an off center position, by driving the molten metal in the feed chamber with an impeller, or both. Also, a bowl-shaped feed chamber helps facilitate the desired swirling flow.

In order to carry the feed material and any initial reaction products quickly into the treatment chamber in the flow of molten reactant metal, the feed material preferably comes into contact with the molten reactant metal in an area adjacent to an inlet to the treatment chamber. An area "adjacent" to the treatment chamber inlet means the area of the surface of the molten reactant metal in the feed chamber generally nearest to the inlet of the treatment chamber. In the form of the invention in which a swirling flow is induced in the feed chamber, the feed material drops into the molten reactant metal in a central area of the feed chamber, at the center of the swirling flow or vortex, and directly above an outlet from the feed chamber/inlet to the treatment chamber. The feed chamber includes an outlet that at least borders the treatment chamber inlet and more preferably comprises a common opening with the treatment chamber inlet. By "bordering" the treatment chamber inlet it is meant that the feed chamber outlet is in the immediate vicinity of the treatment chamber inlet so that there is only a small distance between any point of the feed chamber outlet and any point of the treatment chamber inlet.

The feed material may include substantially any material or mixture of materials suitable for treatment in a molten metal reactor. These materials include hydrocarbons and halogenated hydrocarbons, low and high level radioactive materials, and any other materials that may be chemically reduced in a molten reactant metal such as aluminum, magnesium, or combinations of these metals together with other metals. The invention is particularly suited to treating soils and other bulk solids which have been contaminated with hydrocarbons, halogenated hydrocarbons, other chemically reducible materials, radioactive materials, and metals. As used in this disclosure and the accompanying claims a "feed material" may comprise any of the above-described materials or combinations of these materials.

It will be appreciated by those skilled in the art of molten reactors that the chemical reduction reactions produced by contact with a molten reactant metal may not immediately reduce a given constituent compound included in a feed material. Rather, many chemical compounds suitable for treatment with a molten reactant metal may initially react in or with the metal to produce intermediate reaction products. These intermediate reaction products are then further reduced by reaction in or with the molten reactant metal. The reactions continue in the molten reactant metal until the reduction reactions are substantially complete, leaving only final reaction products. Metals in the feed material compounds are generally reduced to their elemental state, carbon is reduced to its elemental state and goes to a gaseous state at the temperature of the molten reactant metal, halogens form salts with either metals from the molten reactant metal bath or with metals contained in the feed material itself. Nitrogen and hydrogen liberated from the reacted compounds escape from the molten metal bath as gases. Minerals included in soil generally remain unreacted in the molten reactant metal depending upon the makeup of the molten reactant metal bath and its temperature, but may go to a liquid state at the temperature of the molten metal bath.

As used in this disclosure and the accompanying claims, the term "reaction product" is used to refer to any reaction product produced by treatment of the feed material with the molten reactant metal, whether the reaction product is an initial reaction product subject to further reactions in the molten metal or a final reaction product that is chemically stable in the molten reactant metal. The term "reaction product" also refers to materials such as quartz that do not chemically react with the molten reactant metal but may be contained in soil contaminated with materials that do react in the molten reactant metal. Thus, the term "reaction product" means generally any material that results from any reaction of a feed material occurring in the molten reactant metal.

The above-described advantages and features of the invention, along with other advantages and features, will be apparent from the following description of the preferred embodiments, considered along with the accompanying drawings.

DESCRIPTION OF THE PREFERRED EMBODIMENTS

Figure 1:
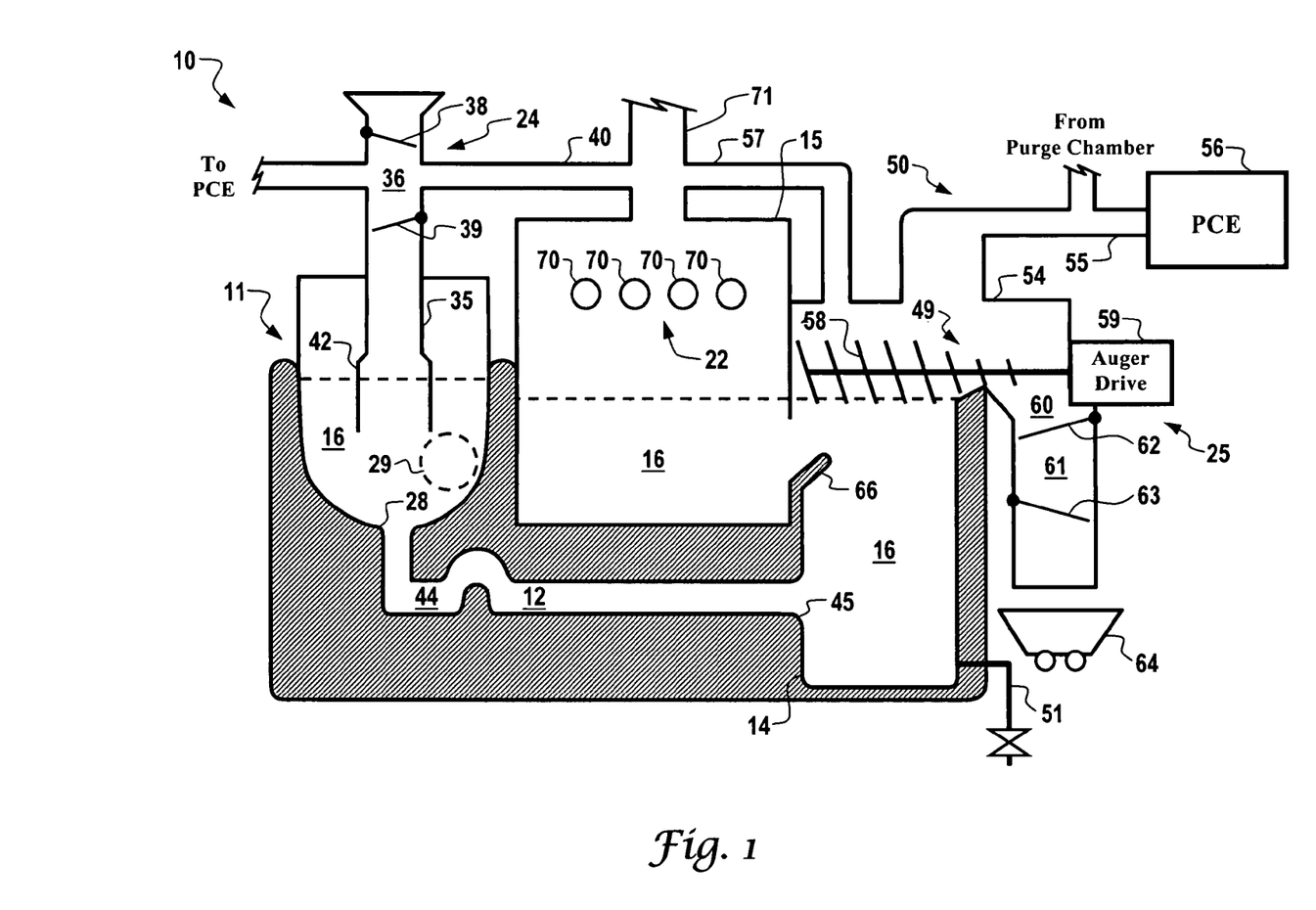
FIG. 1 is a diagrammatic view in section showing a molten metal reactor embodying the principles of the invention.
Figure 2:
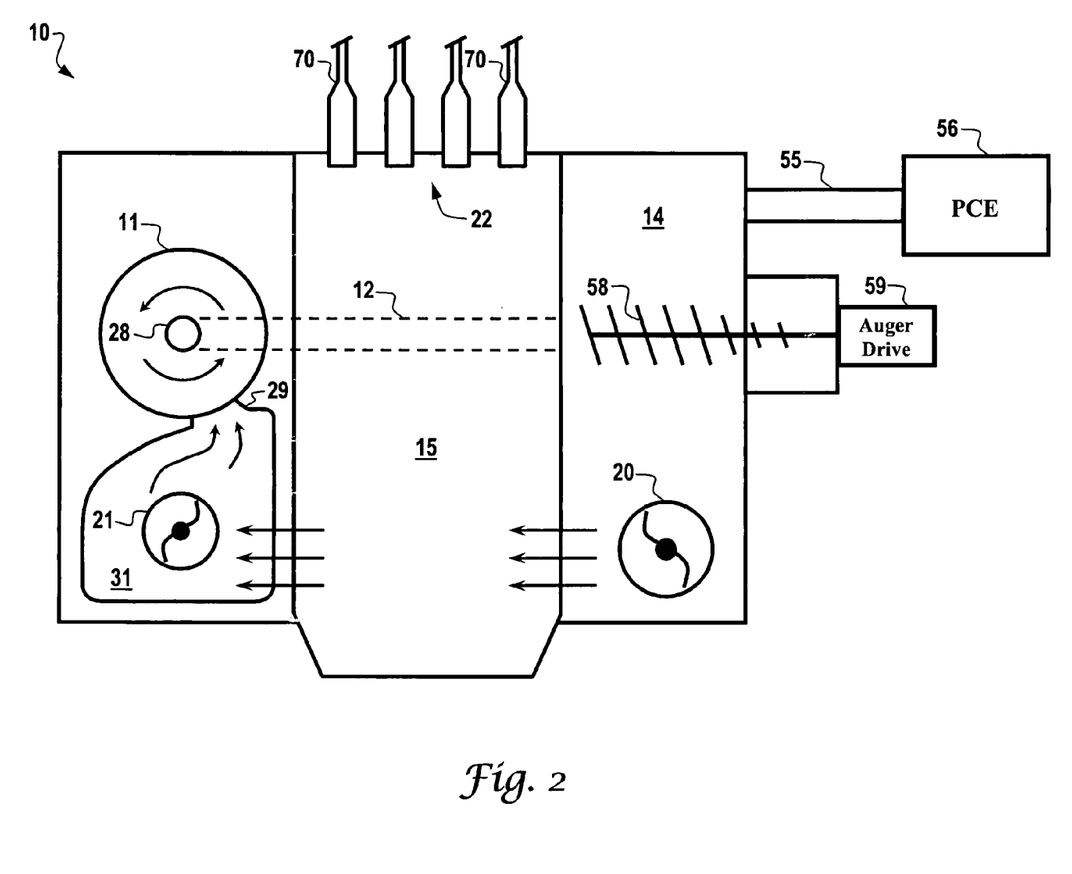
FIG. 2 is a diagrammatic top plan view of the molten metal reactor shown in FIG. 1.

Referring particularly to FIGS. 1 and 2, a molten metal reactor 10 embodying the principles of the invention includes essentially four chambers including a bowl-shaped vortex or feed chamber 11, a treatment chamber 12, an output chamber 14, and a heating chamber 15. Each of these chambers is adapted to contain a molten reactant metal indicated by the reference numeral 16. The level of molten reactant metal 16 in feed chamber 11, output chamber 14 and heating chamber 15 is indicated by the dashed line in the respective chamber. Molten reactant metal 16 is heated to the desired temperature in heating chamber 15 and then transferred to feed chamber 11. From feed chamber 11, molten reactant metal 16 flows rapidly into treatment chamber 12 and then exits the treatment chamber into output chamber 14. From output chamber 14, molten reactant metal 16 returns to heating chamber 15 for reheating and recycling through the reactor 10. Reaction products are removed from reactor 10 through output chamber 14. According to the invention, the flow of molten reactant metal from feed chamber 11 to treatment chamber 12 carries feed materials to be treated into the treatment chamber along with substantially all reaction products liberated from the feed material on initial contact with the molten reactant metal. Treatment chamber 12 provides sufficient residence time to completely react substantially all constituents in the feed material.

FIG. 1 in particular indicates that molten metal reactor 10 includes numerous components that contain or come in contact with molten reactant metal 16. All components that do come in contact with the molten reactant metal are either formed from a material which is resistant to damage from the reactant metal or coated with such a protective material. For example, the system of chambers 11, 12, 14, and 15 may be cast from a refractory material or may be formed from a base material which is then coated with a suitable refractory or other chemically resistant material.

The particular reactant metal utilized in reactor 10 will depend upon the constituents in the feed material which must be destroyed or removed from non-hazardous constituents of the feed material. A preferred reactant metal suitable for use in treating many types of chemicals comprises an alloy of aluminum as disclosed in U.S. Pat. No. 5,000,101 to Wagner, the entire content of which is hereby incorporated in this disclosure. However, it will be appreciated that the makeup of reactant metal 16 may be varied to suit a particular feed material to be treated in reactor 10 and is not limited to aluminum or aluminum alloys. Also, the temperature of reactant metal 16 may be varied to suit the particular feed material to be treated.

Reactor 10 is well suited for treating a number of feed materials, including particularly contaminated soils. The soils may be contaminated with halogenated hydrocarbons or other organic compounds, metals, and low-level radioactive materials. Organic compounds are reduced to liberate carbon and hydrogen. Halogens included in organic compounds generally react with elements of the reactant metal to form metal salts, while other materials dissolve or melt into the molten reactant metal or release from the reactant metal as a gas. Many radioactive materials dissolve or melt into the reactant metal 16 where the radioactive isotopes can be concentrated to the desired level together with radioactive emission absorbing elements. Molten reactant metal and absorbing metal containing the radioactive isotopes may then be drawn off to form ingots that can safely store the radioactive isotopes.

In addition to the chamber arrangement shown in FIGS. 1 and 2, the preferred reactor 10 includes molten metal pumps 20 and 21 shown in FIG. 2, and a heater arrangement 22 associated with at least heating chamber 15. A feed arrangement 24 is associated with feed chamber 11 for transferring feed materials into the system. Also, the illustrated reactor 10 includes a reaction product removal arrangement associated with output chamber 14. The reaction product removal arrangement is shown generally at reference numeral 25.

Referring to both FIGS. 1 and 2, feed chamber 11 includes an outlet 28 generally at the bottom of the feed chamber. Feed arrangement 24 is located preferably immediately over or above outlet 28. Molten reactant metal 16 is supplied into feed chamber 11 through an inlet 29. As shown best in FIG. 2, the preferred form of the invention has inlet 29 positioned off-center from a center vertical axis of feed chamber 11 so that the flow of reactant material into the chamber helps induce a swirling or vortex flow in the feed chamber as will be described further below. Referring still to FIG. 2, reactant metal 16 collects in a supply chamber 31 prior to flowing into feed chamber 11. This flow may be continuous or may be on a batch basis. Where reactant metal is released into feed chamber 11 in batches, a suitable valve (not shown) may be associated with inlet 29. The valve may be closed to allow reactant metal 16 to collect in supply chamber 31 then may be opened to suddenly release the reactant metal into feed chamber 11.

It will be appreciated that it is possible to eliminate pump 21 and instead use a moveable crucible or vessel to periodically lift molten reactant metal from heating chamber 15 and pour the molten metal into supply chamber 31. This moveable crucible form of the invention may be used to introduce a rapid flow of molten reactant metal into supply chamber 31 and then into feed chamber 11.

The preferred form of the invention produces a vortex or swirling flow in the reactant metal 16 contained in feed chamber 11 as the molten metal flows rapidly into the feed chamber and then into treatment chamber 12. This swirling or vortex flow is indicated by the arrows 32 in FIG. 2. In the form of the invention shown in FIGS. 1 and 2, the off-center molten metal inlet 29, bowl-shaped feed chamber 11, and flow rate of molten reactant metal all combine to provide a vortex inducing arrangement. The swirling flow of reactant metal 16 in feed chamber 11 provides a good mixing action to rapidly incorporate or ingest the feed material into the reactant metal. It will be appreciated that the swirling reactant metal or vortex flow of molten reactant metal in feed chamber 11, is not necessary to the present invention but is helpful to the operation of the present invention. Sufficient reactant metal 16 flow rates may be produced to provide the desired waste material entrainment without inducing a vortex in the reactant metal as it flows from feed chamber 11 into treatment chamber 12. For example, molten metal pump 21 may pump molten reactant metal into feed chamber 11 at a rate on the order of fifteen thousand (15,000) pounds per minute to produce high molten metal flow velocities from an appropriately sized feed chamber outlet to an appropriately sized treatment chamber inlet.

Feed arrangement 24 is adapted to transfer feed materials into reactor 10 while minimizing the amount of oxygen entering the reactor. Feed arrangement 24 includes an elongated chute 35 which is preferably centered within feed chamber 11 to drop feed material into the center of vortex or swirling flow, immediately above or adjacent to outlet 28 from the feed chamber to treatment chamber 12. The bottom end of feed chute 35 may be referred to as a feed material inlet into feed chamber 11. Feed chute 35 includes a purge chamber 36 defined between an upper dump gate 38 and a lower dump gate 39. A purge gas, in this case flue gas from heater arrangement 22 is circulated to the purge chamber through conduit 40 to purge chamber 36 of oxygen. In operation, lower dump gate 39 is held in a closed position sealing a bottom of purge chamber 36 while upper dump gate 38 is held open and feed material is loaded into the purge chamber. Once purge chamber 36 is loaded with feed material, upper dump gate 38 is closed and purge gas is circulated through the chamber to purge the chamber of oxygen. After the chamber is sufficiently purged, lower dump gate 39 is opened so that the feed material in chamber 36 drops into the molten reactant metal in feed chamber 11. The opening of lower dump gate 39 to drop feed material into feed chamber 11 may be coordinated with the release of molten reactant metal 16 into the feed chamber to create the desired swirling flow and suction effect as the molten reactant metal flows out of the feed chamber and into treatment chamber 12.

An additional sealing conduit 42 may be associated with the feed chute 35 to isolate the area of feed chamber 11 generally above or adjacent to the feed chamber outlet 28. Additional sealing conduit 42 may be used to ensure that the feed material and reaction products flow along with the reactant metal 16 into treatment chamber 12. It will also be noted that the top of feed chamber 11 above the level of reactant metal 16 is sealed to the atmosphere so that any reaction products that may remain in feed chamber 11 are not released to the atmosphere.

Treatment chamber 12 comprises a tube or conduit extending from the feed chamber outlet opening 28 to output chamber 14. The preferred treatment chamber 12 also includes a gravity trap 44 having a U-shaped segment that helps prevent gases from flowing back into feed chamber 11. Treatment chamber 12 is long enough to provide sufficient residence time, considering the reactant metal flow rate through the tube, to effect a substantially complete reaction of materials that are to be destroyed in the molten metal reactor. Residence times should be approximately three (3) minutes to effect the desired treatment for most feed materials. The flow velocity in treatment chamber 12 may be eight (8) feet per minute.

In order to help maintain the reactant metal 16 at a desired treatment temperature in treatment chamber 12, the treatment chamber may be located immediately adjacent to heating chamber 15 so that heat from the heating chamber is transferred to material within the treatment chamber. Also, although not shown in the drawing, a separate heating system may be associated with the treatment chamber 12 for maintaining the temperature of the molten metal at a desired temperature within the treatment chamber. Any suitable heating system may be used with treatment chamber 12 including an induction heating system using one or more electromagnetic field induction coils positioned adjacent to the treatment chamber.

Although a molten reactant metal level is shown by a dashed line in FIG. 1 for chambers 11, 14 and 15, FIG. 1 does not show a molten reactant metal level in treatment chamber 12. This should not be taken to imply that there will be no gas phase in treatment chamber 12. For many feed materials, a distinct gas phase of reaction products will emerge in the top of treatment chamber 12. However, these reaction products will be held in close proximity to the surface of the molten reactant metal 16 in position to facilitate further reaction of the reaction product if not fully reduced. Gaseous reaction products will also bubble up through molten reactant metal in the output chamber 14 to allow any further reactions possible between the reaction products and molten reactant metal.

A molten metal reactor within the scope of the present invention may include a feed chamber having an outlet that is separate and distinct from an inlet to the treatment chamber in the reactor. However, in the preferred form of the invention shown in FIGS. 1 and 2, feed chamber outlet 28 is common with the inlet to treatment chamber 12, that is, the feed chamber outlet and treatment chamber inlet comprise the same opening. The outlet from the feed chamber according to the invention at least borders the inlet to the treatment chamber. This proximity between feed chamber outlet 28 and the inlet to the treatment chamber combined with the proximity between the point at which the feed material makes initial contact with the molten reactant metal 16 and the rapid flow of molten reactant metal into treatment chamber 12 ensures that the feed material and even any initial reaction products are carried into the treatment chamber where the desired reactions may proceed to completion. The residence time for feed materials in the feed chamber after initial contact with the molten reactant metal should be on the order of ten (10) seconds or less. Residence times in this range will be considered insignificant residence times within the scope of the following claims.

Output chamber 14 is connected to receive material exiting an outlet 45 of treatment chamber 12. The material which flows into outlet chamber 14 includes molten reactant metal 16 remaining after the desired reactions with the feed material and reaction products from the reaction of the feed material with the reactant metal. The reaction products may include molten or gaseous metal salts, gaseous carbon, unreacted solids such as clay particles included in the feed material, metals from the feed material that have dissolved or melted into the reactant metal, and other gases liberated in the various reactions between the molten reactant metal 16 and the feed material. These other gasses will commonly include primarily nitrogen and hydrogen.

The reaction product removal arrangement 25 associated with output chamber 14 includes a skimming system shown generally at reference numeral 49 and a gas and particulate removal system shown generally at reference numeral 50. A tapping system including tapping line 51 with a suitable valve may also be connected to output chamber 14 for removing heavy molten material or dissolved material that may segregate to the bottom of the output chamber.

Gas and particulate removal system 50 includes a collection hood 54 at the top of output chamber 14 and an outlet conduit 55. This outlet conduit 55 preferably leads to particulate control equipment (PCE) 56 such as a bag house or an aqueous scrubber that removes particulates included in, or forming from, the gases exiting output chamber 14 through conduit 55. Flue gas from the heater arrangement 22 may be directed into collection hood 54 through conduit 57 to enhance the flow of gases and particulates out of the system through conduit 55. The purge gas from purge chamber 36 may also be directed into conduit 55 to exit the system through particulate control equipment 56.

Skimming system 49 is located at the top of output chamber 14 for removing solids and light molten materials that segregate to the top of the reactant metal 16 in the output chamber. The illustrated skimming system 49 includes an auger 58 which is rotated by a suitable drive device 59 to skim material floating at the surface of the molten reactant metal 16 to the right in FIG. 1 toward an outlet chute 60. Outlet chute 60 leads to an airlock chamber 61 defined between an upper airlock gate 62 and a lower air lock gate 63. In operation, lower gate 63 is closed and upper gate is held open while auger 59 skims material through outlet chute 60 and into the airlock chamber 61 above the lower gate. After an appropriate amount of skimmed material has collected in airlock chamber 61, upper gate 62 is closed and lower gate 63 is opened to allow material collected in the air lock chamber to drop into a collection vessel 64. Positive pressure maintained in the collection hood 54 provided by the heater flue gas helps ensure significant amounts of oxygen does not flow into the reactor 10 as solid material and light molten material is removed through airlock chamber 61.

One or more deflectors such as deflector 66 may be associated with output chamber 14 to deflect reaction products to the desired locations within the outlet chamber and ensure that materials do not inadvertently enter heating chamber 15. Deflectors may also be used in outlet chamber to enhance contact with the molten reactant metal and help ensure that the desired reactions proceed to completion. That is, deflectors in output chamber 14 may be arranged to cause relatively light reaction products to follow a tortuous path through the molten reactant metal in output chamber 14 before reaching the surface of the molten reactant metal.

Heating chamber 15 comprises a chamber having a lower portion adapted to contain a volume of reactant metal and an upper area which is isolated from the feed chamber 11 and output chamber 14. This isolation is required in the illustrated form of the invention to accommodate the gas fired burners 70 that make up heating arrangement 22 used to heat the reactant metal 16 within heating chamber 15. Exhaust gas from burners 70 exits the upper part of the heating chamber through flue gas stack 71. A portion of this flue gas is directed to purge chamber 36 and to collection hood 54 as described above. Although gas fired burners are shown in the illustrated form of the invention, other heating systems such as an induction heating system for example, may be employed to heat the reactant metal 16 in heating chamber 15. Of course, when electromagnetic induction heating is used to heat reactant metal 16, a separate purge gas must be used in connection with feed purge chamber 36 and collection hood 54 since the flue gas would not be present.

Proper flow and circulation of molten reactant metal 16 in reactor 10 is important to the proper operation of the reactor. In particular, the flow of molten reactant metal 16 from feed chamber 11 to treatment chamber 12 should be at a sufficient rate to entrain or entrap feed material and substantially any initial reaction products, and cause these materials to be carried or swept into the treatment chamber and ultimately into output chamber 14. Minimum flow velocities of molten reactant metal into treatment chamber 14 will depend upon the fluid properties of the particular molten reactant metal and the specific gravity and other properties of the feed material. The desired flow rates may be produced using pumps for moving the molten reactant metal. FIG. 2 shows two molten metal pumps in the preferred form of the invention. Pump 20 pumps molten reactant metal 16 from output chamber 14 to heating chamber 15. Pump 21 pumps the heated or reheated molten reactant metal 16 from heating chamber 15 to feed chamber 11, in the illustrated case through supply chamber 31.

It will be noted from FIG. 1 that the level of molten reactant metal 16 in feed chamber 11 may be higher than in heating chamber 15 and output chamber 14. In this arrangement the molten reactant metal 16 provides a hydrostatic head which helps cause the molten metal to flow from feed chamber 11 into treatment chamber 12 and then into output chamber 14. However, the desired flow rates and vortex or swirling flow may be produced without the higher molten reactant metal level in feed chamber 11. Also, it will be appreciated that the desired flow rates of molten reactant metal into treatment chamber 14 may be produced without the illustrated molten metal pumps. As discussed above, in alternative arrangements a portion of the molten reactant metal from heating chamber 15 may be lifted in a suitable vessel and dumped into feed chamber 11 (or into supply chamber 31) in order to produce the desired flow of reactant metal 16 through the feed chamber and into treatment chamber 12. Alternatively, molten reactant metal 16 may be collected in supply chamber 31 and released abruptly to flush feed material from feed chamber 11 into treatment chamber 12.

Figure 3:
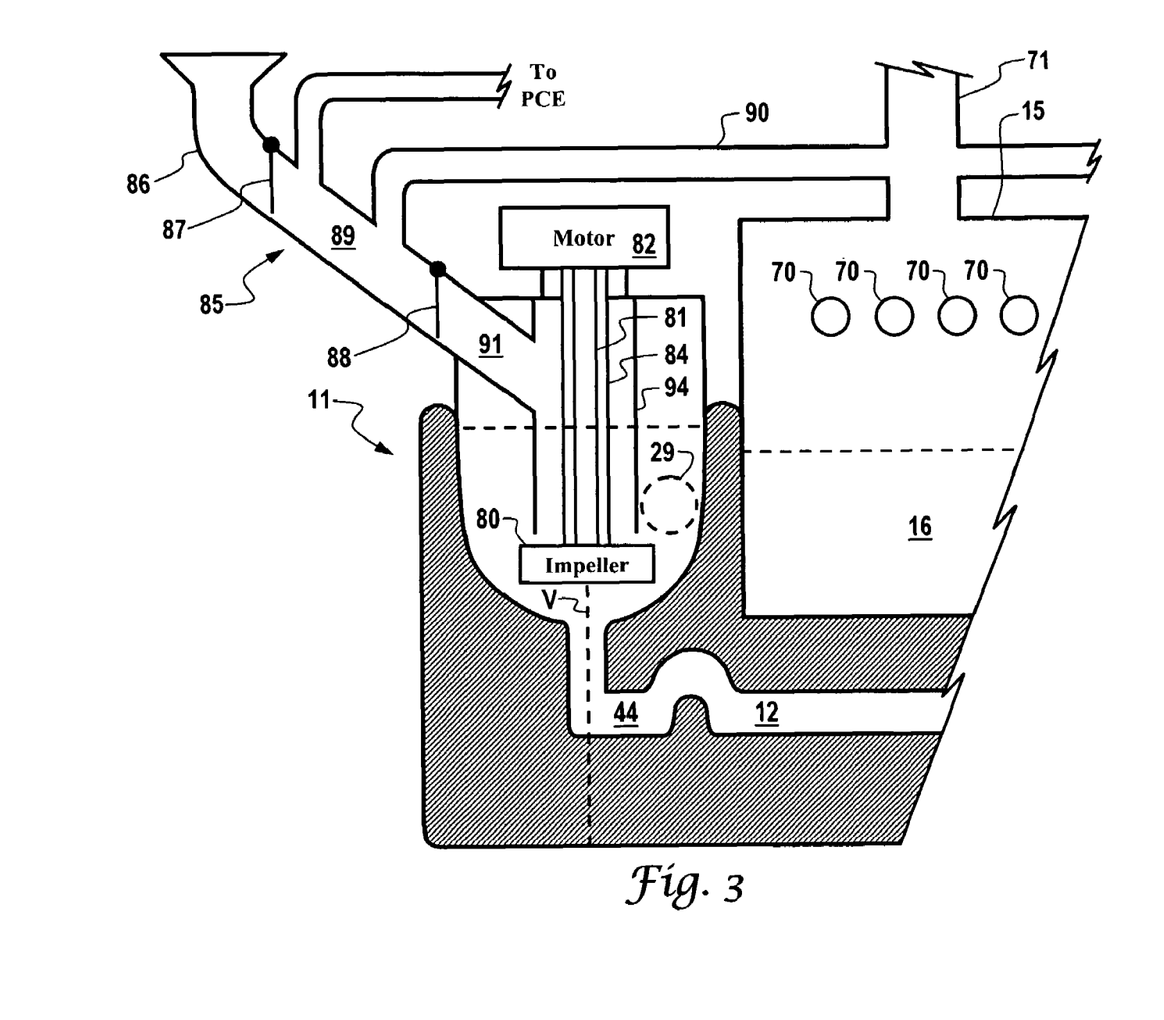
FIG. 3 is a diagrammatic view in section similar to FIG. 1 but showing an alternate form of the feed arrangement.

FIG. 3 shows an alternate vortex inducing arrangement according to the invention. This alternative form of the invention includes the same preferably bowl-shaped feed chamber 11, treatment chamber 12, and heating chamber 15 included in the embodiment shown in FIGS. 1 and 2. FIG. 3 is broken to omit other portions of the reactor that are identical to those set out in FIGS. 1 and 2, and do not involve the alternate vortex inducing arrangement. In the form of the invention shown in FIG. 3, an impeller 80 is included to help induce the desired swirling or vortex flow of molten reactant metal in feed chamber 11. Impeller 80 may comprise any suitable impeller device suitable for use in a molten reactant metal. U.S. Pat. No. 4,930,986 shows a suitable impeller, and is incorporated herein by this reference. The type of impeller shown in this patent also forces feed material and molten reactant metal downwardly in feed chamber 11 toward the outlet to treatment chamber 12. Impeller 80 is driven by drive shaft 81 about a vertical axis V aligned generally in the center of feed chamber 11. A suitable motor and drive device 82 rotates drive shaft 81. Drive shaft 81 preferably extends though a protective conduit 84. Conduit 84 helps protect drive shaft 81 from feed material entering the reactor through feed arrangement 85.

Because the center portion of feed chamber 11 is occupied by the impeller 80 and supporting structure, feed arrangement 85 differs from feed arrangement 24 shown in FIG. 1. Feed arrangement 85 includes an elongated feed chute 86 that extends at an acute angle with respect to axis V. Feed chute 86 includes upper and lower dump gates 87 and 88 respectively to define a purge chamber 89 similar to purge chamber 36 shown in FIG. 1. The dump gates purge line 90 and purge chamber all operate similarly to the corresponding elements shown in FIG. 1 and thus will not be described further here.

An outlet end 91 of feed chute 86 represents a feed material inlet to feed chamber 11 and terminates in a sealing or confinement conduit 94 similar to the sealing conduit 42 shown in FIG. 1 and functions similarly to help confine feed material just to the volume of molten reactant metal 16 immediately above the feed chamber outlet 28.

The flow rate of molten reactant metal 16 into and out of feed chamber 11 may be the same as in the embodiment described with reference to FIGS. 1 and 2. Thus, the flow of molten metal 16 through inlet 29 and the bowl shape of feed chamber 11 may be sufficient to induce some swirling flow in the feed chamber around axis V. Impeller 80 enhances the swirling flow and further helps to submerge and entrain feed material in the molten reactant metal 16 so that the feed material may be quickly carried in the flow of molten metal into treatment chamber 12.

Figure 4:
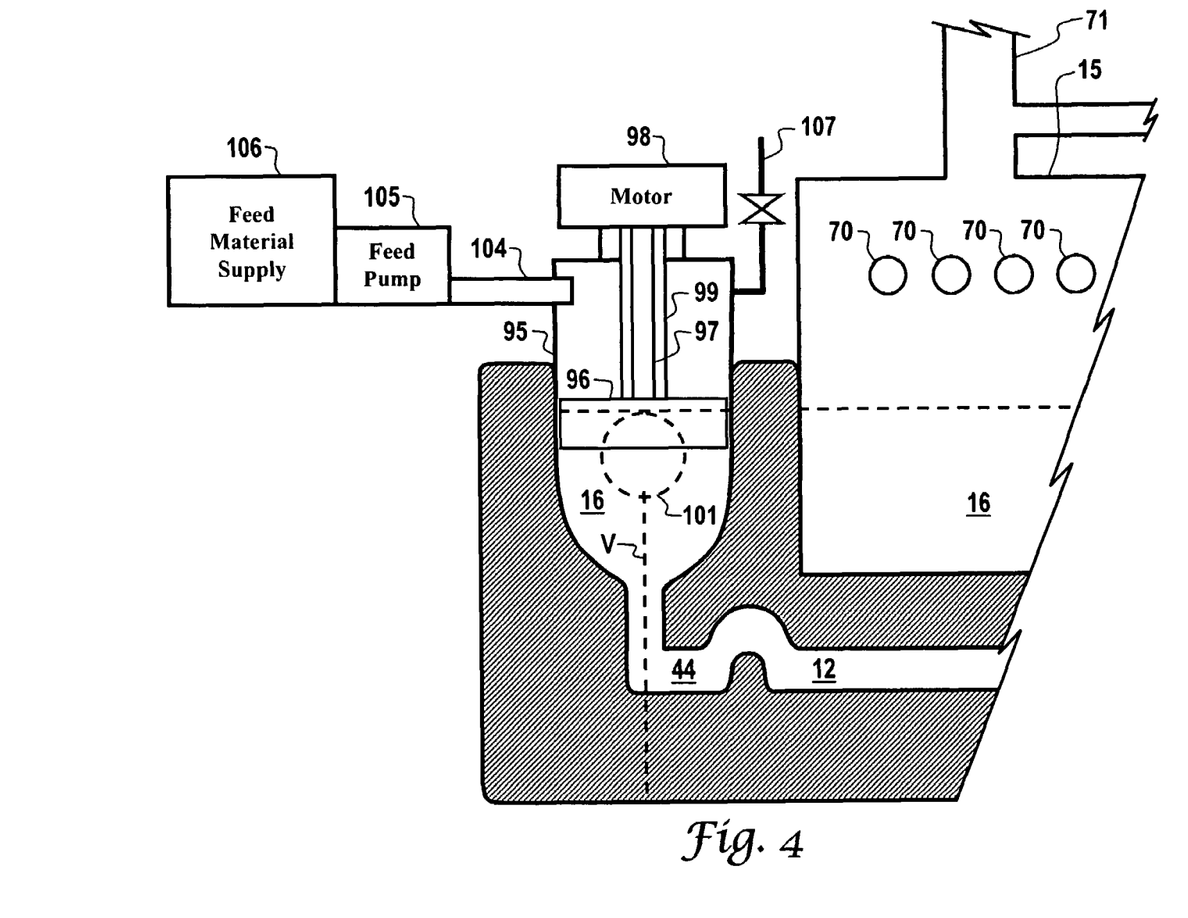
FIG. 4 is a diagrammatic view in section similar to FIG. 3, showing yet another alternate feed arrangement according to the invention.

FIG. 4 shows yet another alternate feed arrangement for a reactor within the scope of the present invention. This alternative feed arrangement includes a treatment chamber 12 and heating chamber 15 similar to those described in FIG. 1. The output chamber 14 and related components are also similar to those shown in FIG. 1 and are therefore omitted from FIG. 4.

The alternative feed arrangement shown in FIG. 4 includes a feed chamber 95 that is just large enough in diameter to accommodate an impeller 96 similar to impeller 80 described above with reference to FIG. 3. Impeller 96 is driven on a shaft 97 by motor 98 and the shaft is protected by housing 99. Molten reactant metal 16 enters feed chamber 95 through inlet 101 which preferably resides near the level of molten reactant metal maintained in the feed chamber. Impeller 96 is positioned so that it traverses the level of the molten reactant metal 16 in feed chamber 95, and preferably comprises an impeller such as that described in U.S. Pat. No. 4,930,986 to force materials downwardly along axis V in the feed chamber. The illustrated preferred positioning of impeller 96 also allows the impeller to contact and quickly submerge feed materials into the molten reactant metal 16 in feed chamber 95. In other arrangements within the scope of the accompanying claims, the impeller may be located below the level of molten reactant metal in feed chamber 95. In other arrangements within the scope of the invention or set out in the accompanying claim, the impeller may be below the level of molten reactant metal.

Feed materials enter feed chamber 95 through feed material conduit 104. A suitable feed material pump 105 pumps or forces feed material from a feed material supply vessel 106 through conduit 104 and into feed chamber 95. Feed material pump 105 may comprise a diaphragm pump or an auger type pump for example. This feed material arrangement shown in FIG. 4 is particularly suited for feed materials in the form of loose particles such as loose soils or feed materials in the form of a slurry.

The pumping arrangement for the feed material obviates the need for the purge chamber and dump gate arrangement shown in FIGS. 1 and 3. The positive pressure provided by pump 105 prevents gasses from exiting feed chamber 95 through feed material conduit 104. A pressure relief line 107 with suitable valving may be provided in the top of feed chamber 95 to periodically remove reaction product gasses or other gasses that might collect in the feed chamber. Depending upon the nature of these gasses, the gasses removed through line 107 may or may not be subjected to treatment before release to the atmosphere. In some cases the gasses may simply be directed through particulate control equipment associated with the reactor's reaction product removal equipment shown in FIG. 1.

The above described preferred embodiments are intended to illustrate the principles of the invention, but not to limit the scope of the invention. Various other embodiments and modifications to these preferred embodiments may be made by those skilled in the art without departing from the scope of the following claims. For example, the feed pump and feed conduit 104 arrangement shown in FIG. 4 may be replaced by the feed chute and dump gate arrangement shown in FIG. 3, and the feed chambers 11 shown in FIGS. 1 and 3 may include a relief line similar to line 107 shown in FIG. 4. Also, those skilled in the art will appreciate that many technical details have been omitted from the diagrammatic representations shown in FIGS. 1 and 2 in order to avoid obscuring the invention in unnecessary detail. These details such as valves and control systems will be apparent to those of ordinary skill in the art from the above description of molten metal reactor 10.

The invention claimed is:
1. A molten metal reactor including:
(a) a treatment chamber having a treatment chamber inlet;
(b) a molten reactant metal flow inducing arrangement for inducing a flow of molten reactant metal into the treatment chamber through the treatment chamber inlet;
(c) a feed chamber having a feed chamber outlet located adjacent to the treatment chamber inlet;
(d) an output chamber connected to an outlet of the treatment chamber to receive molten reactant metal and reaction products from the treatment chamber;

(e) a supply chamber connected to the output chamber and to the feed chamber; and (f) a feed chute having a feed material inlet into the feed chamber through which a feed material to be treated in the molten reactant metal enters the feed chamber, the feed chute also having a portion extending into the feed chamber so that the feed material inlet into the feed chamber is positioned within the area defined by the feed chamber and spaced apart from the boundaries of the feed chamber.

2. The molten metal reactor of claim 1 wherein the feed chamber outlet and the treatment chamber inlet comprise a common opening.

3. The molten metal reactor of claim 2 further including a vortex inducing arrangement for inducing a swirling flow in the feed chamber outlet.

4. The molten metal reactor of claim 2 wherein the feed chamber comprises a bowl shaped chamber and the feed chamber outlet is located in substantially the center of the bowl shape at a bottom of the feed chamber.

5. The molten metal reactor of claim 2 further including an impeller mounted in the feed chamber and adapted to be rotated about a substantially vertical axis.

6. The molten metal reactor of claim 2 including an off-center molten reactant metal inlet to the feed chamber through which molten reactant metal is introduced into the feed chamber to induce a swirling flow in the feed chamber.

7. The molten metal reactor of claim 1 wherein at least a portion of the treatment chamber is in a heat transfer relationship with the supply chamber.

8. The molten metal reactor of claim 1 further including a gravity trap within the treatment chamber.

9. The molten metal reactor of claim 1 wherein the feed material inlet into the feed chamber is positioned directly above the feed chamber outlet.

10. The molten metal reactor of claim 1 wherein the feed chute is connected to a sealing conduit that extends to a position below a liquid reactant metal level in the feed chamber.

11. A molten metal reactor including:

(a) a treatment chamber having a treatment chamber inlet;

(b) a feed chamber having a feed chamber outlet located adjacent to the treatment chamber inlet;

(c) an output chamber connected to an outlet of the treatment chamber to receive molten reactant metal and reaction products from the treatment chamber;

(d) a molten reactant metal source connected to direct molten reactant metal into the feed chamber; and (e) a feed chute having a feed material inlet into the feed chamber through which a feed material to be treated with the molten reactant metal enters the feed chamber, the feed chute also having (i) a portion extending into the feed chamber so that the feed material inlet into the feed chamber is positioned within the area defined by the feed chamber and is spaced apart from the boundaries of the feed chamber, and (ii) a feed material release structure for selectively releasing the feed material through the feed chute toward the feed chamber.

12. The molten metal reactor of claim 11 wherein the molten reactant metal source includes a supply chamber connected between the output chamber and the feed chamber.

13. The molten metal reactor of claim 12 further including at least one molten metal pump for inducing a flow of molten metal from the supply chamber to the feed chamber.

14. The molten metal reactor of claim 11 wherein the feed material inlet into the feed chamber is positioned directly above the feed chamber outlet.

15. The molten metal reactor of claim 14 wherein the feed chute extends substantially vertically.

16. The molten metal reactor of claim 11 wherein the feed chute is connected to a sealing conduit that extends to a position below a liquid reactant metal level in the feed chamber.

17. The molten metal reactor of claim 11 wherein a portion of the feed chute extends transversely through the feed chamber in a direction from one lateral side of the feed chamber toward an opposite lateral side of the feed chamber.

* * * * *